(12) United States Patent
Variyath et al.

(10) Patent No.: US 8,570,373 B2
(45) Date of Patent: Oct. 29, 2013

(54) TRACKING AN OBJECT UTILIZING LOCATION INFORMATION ASSOCIATED WITH A WIRELESS DEVICE

(75) Inventors: Girish S. Variyath, Cupertino, CA (US); Karthikeyan Ganesan, Santa Clara, CA (US); Vikram Jayaraman, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1361 days.

(21) Appl. No.: 11/760,137

(22) Filed: Jun. 8, 2007

(65) Prior Publication Data

US 2008/0303901 A1 Dec. 11, 2008

(51) Int. Cl.
*H04N 9/47* (2006.01)
*H04N 7/00* (2011.01)
*H04N 7/18* (2006.01)

(52) U.S. Cl.
USPC .............................. 348/143; 348/39; 348/159

(58) Field of Classification Search
USPC ........................................................ 348/143
See application file for complete search history.

(56) References Cited

U.S. PATENT DOCUMENTS

| | | | |
|---|---|---|---|
| 2,911,462 A | 11/1959 | Brady | |
| 3,793,489 A | 2/1974 | Sank | |
| 3,909,121 A | 9/1975 | De Mesquita Cardoso | |
| 4,494,144 A | 1/1985 | Brown | |
| 4,750,123 A * | 6/1988 | Christian | ........................ 701/28 |
| 4,815,132 A | 3/1989 | Minami | |
| 4,853,764 A | 8/1989 | Sutter | |
| 4,961,211 A | 10/1990 | Tsugane et al. | |
| 5,020,098 A | 5/1991 | Celli | |
| 5,136,652 A | 8/1992 | Jibbe et al. | |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |
| 5,268,734 A * | 12/1993 | Parker et al. | ............. 356/139.06 |
| 5,317,405 A | 5/1994 | Kuriki et al. | |
| 5,337,363 A | 8/1994 | Platt | |
| 5,347,363 A | 9/1994 | Yamanaka | |
| 5,406,326 A | 4/1995 | Mowry | |
| 5,423,554 A | 6/1995 | Davis | |
| 5,446,834 A | 8/1995 | Deering | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

U.S. Appl. No. 12/781,722, filed May 17, 2010, entitled "System and Method for Providing Retracting Optics in a Video Conferencing Environment," Inventor(s): Joseph T. Friel, et al.

(Continued)

*Primary Examiner* — Richard G Keehn

(57) ABSTRACT

In one embodiment, a method of tracking an object carrying a wireless location device comprises recording and storing images from a plurality of cameras corresponding to respective coverage areas having predetermined locations, determining location information associated with the wireless location device, the location information corresponding to one or more of said coverage areas, and determining which of the images correspond to the location information, and retrieving said images.

21 Claims, 6 Drawing Sheets

(56) References Cited

U.S. PATENT DOCUMENTS

| | | | |
|---|---|---|---|
| 5,448,287 A | 9/1995 | Hull | |
| 5,467,401 A | 11/1995 | Nagamitsu et al. | |
| 5,495,576 A | 2/1996 | Ritchey | |
| 5,502,481 A | 3/1996 | Dentinger et al. | |
| 5,532,737 A | 7/1996 | Braun | |
| 5,541,639 A | 7/1996 | Takatsuki et al. | |
| 5,541,773 A | 7/1996 | Kamo et al. | |
| 5,625,410 A | 4/1997 | Washino et al. | |
| 5,666,153 A | 9/1997 | Copeland | |
| 5,675,374 A | 10/1997 | Kohda | |
| 5,729,471 A | 3/1998 | Jain et al. | |
| 5,748,121 A | 5/1998 | Romriell | |
| 5,760,826 A | 6/1998 | Nayar | |
| 5,790,182 A | 8/1998 | Hilaire | |
| 5,815,196 A | 9/1998 | Alshawi | |
| 5,940,118 A | 8/1999 | Van Schyndel | |
| 5,940,530 A | 8/1999 | Fukushima et al. | |
| 5,956,100 A | 9/1999 | Gorski | |
| 6,101,113 A | 8/2000 | Paice | |
| 6,124,896 A | 9/2000 | Kurashige | |
| 6,148,092 A | 11/2000 | Qian | |
| 6,167,162 A | 12/2000 | Jacquin et al. | |
| 6,226,035 B1 | 5/2001 | Korein et al. | |
| 6,249,318 B1 | 6/2001 | Girod et al. | |
| 6,266,082 B1 | 7/2001 | Yonezawa et al. | |
| 6,285,392 B1 | 9/2001 | Satoda et al. | |
| 6,424,377 B1 | 7/2002 | Driscoll, Jr. | |
| 6,493,032 B1 | 12/2002 | Wallerstein et al. | |
| 6,583,808 B2 | 6/2003 | Boulanger et al. | |
| 6,593,956 B1 | 7/2003 | Potts et al. | |
| 6,680,856 B2 | 1/2004 | Schreiber | |
| 6,704,048 B1 | 3/2004 | Malkin et al. | |
| 6,751,106 B2 | 6/2004 | Zhang et al. | |
| 6,819,354 B1 * | 11/2004 | Foster et al. | 348/157 |
| 6,917,271 B2 | 7/2005 | Zhang et al. | |
| 6,963,653 B1 | 11/2005 | Miles | |
| 6,980,526 B2 | 12/2005 | Jang et al. | |
| 6,990,086 B1 | 1/2006 | Holur et al. | |
| 7,002,973 B2 | 2/2006 | MeLampy et al. | |
| 7,028,092 B2 | 4/2006 | MeLampy et al. | |
| 7,031,311 B2 | 4/2006 | MeLampy et al. | |
| 7,057,662 B2 | 6/2006 | Malzbender | |
| 7,061,896 B2 | 6/2006 | Jabbari et al. | |
| 7,080,157 B2 | 7/2006 | McCanne | |
| 7,111,045 B2 | 9/2006 | Kato et al. | |
| 7,136,651 B2 | 11/2006 | Kalavade | |
| D533,525 S | 12/2006 | Arie | |
| D533,852 S | 12/2006 | Ma | |
| D534,511 S | 1/2007 | Maeda et al. | |
| D535,954 S | 1/2007 | Hwang et al. | |
| 7,158,674 B2 | 1/2007 | Suh | |
| 7,161,942 B2 | 1/2007 | Chen et al. | |
| D539,243 S | 3/2007 | Chiu et al. | |
| D541,773 S | 5/2007 | Chong et al. | |
| D542,247 S | 5/2007 | Kinoshita et al. | |
| 7,246,118 B2 | 7/2007 | Chastain et al. | |
| D550,635 S | 9/2007 | DeMaio et al. | |
| D551,184 S | 9/2007 | Kanou et al. | |
| D555,610 S | 11/2007 | Yang et al. | |
| 7,336,299 B2 | 2/2008 | Kostrzewski | |
| D567,202 S | 4/2008 | Rieu Piquet | |
| 7,353,279 B2 | 4/2008 | Durvasula et al. | |
| 7,359,731 B2 | 4/2008 | Choksi | |
| 7,411,975 B1 | 8/2008 | Mohaban | |
| 7,428,000 B2 | 9/2008 | Cutler et al. | |
| D578,496 S | 10/2008 | Leonard | |
| 7,471,320 B2 | 12/2008 | Malkin et al. | |
| 7,477,657 B1 | 1/2009 | Murphy et al. | |
| D588,560 S | 3/2009 | Mellingen et al. | |
| 7,518,051 B2 | 4/2009 | Redmann | |
| 7,545,761 B1 | 6/2009 | Kalbag | |
| D602,453 S | 10/2009 | Ding et al. | |
| 7,616,226 B2 | 11/2009 | Roessler et al. | |
| D610,560 S | 2/2010 | Chen | |
| D615,514 S | 5/2010 | Mellingen et al. | |
| D626,102 S | 10/2010 | Buzzard et al. | |
| D626,103 S | 10/2010 | Buzzard et al. | |
| D628,175 S | 11/2010 | Desai et al. | |
| D628,968 S | 12/2010 | Desai et al. | |
| 7,990,422 B2 * | 8/2011 | Ahiska et al. | 348/218.1 |
| 2002/0108125 A1 * | 8/2002 | Joao | 725/139 |
| 2002/0140804 A1 | 10/2002 | Colmenarez et al. | |
| 2002/0149672 A1 | 10/2002 | Clapp et al. | |
| 2002/0186528 A1 | 12/2002 | Huang | |
| 2003/0048218 A1 * | 3/2003 | Milnes et al. | 342/357.07 |
| 2003/0072460 A1 | 4/2003 | Gonopolskiy et al. | |
| 2003/0160861 A1 | 8/2003 | Barlow et al. | |
| 2004/0003411 A1 * | 1/2004 | Nakai et al. | 725/105 |
| 2004/0061787 A1 | 4/2004 | Liu et al. | |
| 2004/0091232 A1 | 5/2004 | Appling, III | |
| 2004/0119814 A1 | 6/2004 | Clisham et al. | |
| 2004/0164858 A1 | 8/2004 | Lin | |
| 2004/0178955 A1 * | 9/2004 | Menache et al. | 342/463 |
| 2004/0246962 A1 | 12/2004 | Kopeikin et al. | |
| 2004/0254982 A1 | 12/2004 | Hoffman et al. | |
| 2004/0260796 A1 | 12/2004 | Sundqvist et al. | |
| 2005/0007954 A1 | 1/2005 | Sreemanthula et al. | |
| 2005/0024484 A1 | 2/2005 | Leonard | |
| 2005/0081160 A1 | 4/2005 | Wee et al. | |
| 2005/0110867 A1 | 5/2005 | Schulz | |
| 2005/0117022 A1 * | 6/2005 | Marchant | 348/207.11 |
| 2005/0147257 A1 | 7/2005 | Melchior et al. | |
| 2005/0248652 A1 | 11/2005 | Firestone et al. | |
| 2005/0268823 A1 | 12/2005 | Bakker et al. | |
| 2006/0017807 A1 | 1/2006 | Lee et al. | |
| 2006/0028983 A1 | 2/2006 | Wright | |
| 2006/0056056 A1 * | 3/2006 | Ahiska et al. | 359/690 |
| 2006/0066717 A1 | 3/2006 | Miceli | |
| 2006/0082643 A1 * | 4/2006 | Richards | 348/36 |
| 2006/0120307 A1 | 6/2006 | Sahashi | |
| 2006/0120568 A1 * | 6/2006 | McConville et al. | 382/115 |
| 2006/0125691 A1 * | 6/2006 | Menache et al. | 342/450 |
| 2006/0152489 A1 | 7/2006 | Sweetser et al. | |
| 2006/0152575 A1 | 7/2006 | Amiel et al. | |
| 2006/0182436 A1 * | 8/2006 | Tabuchi et al. | 396/287 |
| 2006/0256187 A1 | 11/2006 | Sheldon et al. | |
| 2006/0274157 A1 * | 12/2006 | Levien et al. | 348/220.1 |
| 2006/0284786 A1 | 12/2006 | Takano et al. | |
| 2007/0039030 A1 | 2/2007 | Romanowich et al. | |
| 2007/0040928 A1 * | 2/2007 | Jung et al. | 348/362 |
| 2007/0052856 A1 * | 3/2007 | Jung et al. | 348/565 |
| 2007/0109411 A1 * | 5/2007 | Jung et al. | 348/207.1 |
| 2007/0121353 A1 | 5/2007 | Zhang et al. | |
| 2007/0140337 A1 | 6/2007 | Lim et al. | |
| 2007/0182818 A1 * | 8/2007 | Buehler | 348/143 |
| 2007/0206556 A1 | 9/2007 | Yegani et al. | |
| 2007/0217406 A1 | 9/2007 | Riedel et al. | |
| 2007/0217500 A1 | 9/2007 | Gao et al. | |
| 2007/0222865 A1 * | 9/2007 | Levien et al. | 348/222.1 |
| 2007/0247470 A1 | 10/2007 | Dhuey et al. | |
| 2007/0250567 A1 | 10/2007 | Graham et al. | |
| 2007/0250620 A1 | 10/2007 | Shah et al. | |
| 2008/0077390 A1 | 3/2008 | Nagao | |
| 2008/0167078 A1 * | 7/2008 | Eibye | 455/566 |
| 2008/0208444 A1 * | 8/2008 | Ruckart | 701/200 |
| 2008/0240237 A1 | 10/2008 | Tian et al. | |
| 2008/0240571 A1 | 10/2008 | Tian et al. | |
| 2009/0009593 A1 | 1/2009 | Cameron et al. | |
| 2009/0122867 A1 | 5/2009 | Mauchly et al. | |
| 2009/0207233 A1 | 8/2009 | Mauchly et al. | |
| 2009/0207234 A1 | 8/2009 | Chen et al. | |
| 2009/0244257 A1 | 10/2009 | MacDonald et al. | |
| 2009/0256901 A1 | 10/2009 | Mauchly et al. | |
| 2009/0279476 A1 * | 11/2009 | Li et al. | 370/328 |
| 2009/0324023 A1 | 12/2009 | Tian et al. | |
| 2010/0123770 A1 | 5/2010 | Friel et al. | |
| 2010/0171808 A1 | 7/2010 | Harrell et al. | |
| 2010/0208078 A1 | 8/2010 | Tian et al. | |
| 2010/0225732 A1 | 9/2010 | De Beer et al. | |
| 2010/0283829 A1 | 11/2010 | De Beer et al. | |

(56) References Cited

U.S. PATENT DOCUMENTS

FOREIGN PATENT DOCUMENTS

| | | |
|---|---|---|
| EP | 0 650 299 | 10/1994 |
| EP | 0 714 081 | 11/1995 |
| EP | 0 740 177 | 4/1996 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| GB | 2 294 605 A | 5/1996 |
| GB | 2 355 876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 2005/013001 A2 | 2/2005 |
| WO | WO 2005/031001 A3 | 2/2005 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |

OTHER PUBLICATIONS

U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/375,458, filed Sep. 22, 2010, entitled "Video Unit With Integrated Features," Inventor(s): Kyle A. Buzzard et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s); John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010; entitled "Interface Element," Inveritor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
3G, "World's First 3G Video Conference Service with New TV Commercial," Apr. 28, 2005, 4 pages; http://www.3g.co.uk/PR/April2005/1383.htm.
Andersson, L., et al., ""LDP Specification,"" Network Working Group, RFC 3036, Jan. 2001, 133 pages; http://tools.ietf.org/html/rfc3036.
Awduche, D., et al., "Requirements for Traffic Engineering over MPLS," Network Working Group, RFC 2702, Sep. 1999, 30 pages; http://tools.ietf.org/pdf/rfc2702.pdf.
Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1& ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf& ei=A28RTLKRDeftnQeXzZGRAw&usg=AFQjCNHpwj5MwjgGp-3goVzSWad6CO-Jzw.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
Digital Video Enterprises, "DVE Eye Contact Silhouette," 1 page, © DVE 2008; http://www.dvetelepresence.com/products/eye ContactSilhouette.asp.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gundaveili S., et al., "Proxy Mobile IPv6," Network Working Group, RFC 5213, Aug. 2008, 93 pages; http://tools.ietf.org/pdf/rfc521.pdf.

(56) References Cited

OTHER PUBLICATIONS

Hopper, D., "Efficiency Analysis and Application of Uncovered Background Prediction in a Low BitRate Image Coder," IEEE Transactions on Communications, vol. 38, No. 9, pp. 1578-1584, Sep. 1990.

Jamoussi, Bamil, "Constraint-Based LSP Setup Using LDP," MPLS Working Group, Sep. 1999, 34 pages; http://tools.ietf.org/html/draft-ietf-mpls-cr-idp-03.

Jeyatharan, M., et al., "3GPP TFT Reference for Flow Binding," MEXT Working Group, Mar. 2, 2010, 11 pages; http://www.ietf.org/id/draft-jeyatharan-mext-flow-tftemp-reference-00.txt.

Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Kolsch, Mathias, "Vision Based Hand Gesture Interfaces for Wearable Computing and Virtual Environments," A Dissertation submitted in partial satisfacton of the requirements for the degree of Doctor of Philosophy in Computer Science, University of California, Santa Barbara, Nov. 2007, 288 pages; http://fulfillment.umi.com/dissertations/b7afbcb56ba72fdb14d26dfccc6b470f/1291487062/3143800.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNicrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

PCT International Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranject, "Signaling in MPLS Networks with RSVP-TE-Technology Information," Telecommunications, Nov. 2000, 3 pages; http://findarticles.com/p/articles/mi_mOTLC/is_11_34/ai_67447072/.

Trevor Darrell, "A Real-Time Virtual Mirror Display," 1 page, Sep. 9, 1998; http://people.csail.mit.edu/trevor/papers/1998-021/node6.html.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwjkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong/com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

(56) References Cited

OTHER PUBLICATIONS

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKI5Tb9I4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

Arrington, Michael, "eJamming—Distributed Jamming," TechCrunch; Mar. 16, 2006; http://www.techcrunch.com/2006/03/16/ejamming-distributed-jamming/; 1 page.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Chan et al., "Experiments on Block-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

"Cisco Expo Germany 2009 Opening," Posted on YouTube on May 4, 2009; http://www.youtube.com/watch?v=SDKsaSlz4MK; 2 pages.

eJamming Audio, Learn More; [retrieved and printed on May 27, 2010] http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili, D., et al., "Orchestral; A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=arnumber=778626; 2 pages.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers.siggraph96.vc.pdf; 8 pages.

Jiang, Minqiang, et al., "On Lagrange Multiplier and Quantizer Adjustment of H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/liy_ICME2004.pdf; 4 pages.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

PCT "International Search Report and the Written Opinion of the International Searching Authority, or the Declaration," PCT/US2010/026456, dated Jun. 29, 2010, 11 pages.

PCT Search Report for PCT Application No. PCT/US2009/064061 dated Feb. 11, 2010, 4 pages.

PCT Written Opinion for PCT Application No. PCT/US2009/064061 dated Feb. 23, 2010; 14 pages.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estimation_pcs06.pdf; 6 pages.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Sullivan, Gary J.,et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2., pp. 182-190.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

(56) References Cited

OTHER PUBLICATIONS

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
U.S. Appl. No. 12/234,291, filed Sep. 19, 2008, entitled "System and Method for Enabling Communication Session in a Network Environment," Inventor(s): Yifan Gao et al.
U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,540, filed Mar. 9, 2009, entitled "System and Method for Providing Three Dimensional Video Conferencing in a Network Environment," Inventor(s): Karthik Dakshinamoorthy et al.
U.S. Appl. No. 12/400,582, filed Mar. 9, 2009, entitled "System and Method for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/727,089, filed Mar. 18, 2010, entitled "System and Method for Enhancing Video Images in a Conference Environment," Inventor: Joseph T. Friel.
U.S. Appl. No. 12/784,257, filed May 20, 2010, entitled "Implementing Selective Image Enhancement," Inventor: Dihong Tian et al.
"3D Particles Experiments in AS3 and Flash CS3," printed Mar. 18, 2010, 2 pages; http://www.flashandmath.com/advanced/fourparticles/notes.html.
Active8-3D—Holographic Projection—3D Hologram Retail Display & Video Project, [retrieved Feb. 24, 2009], http://www.activ8-3d.co.uk/3d_holocubes, 1 page.
Avrithis, Y., et al., "Color-Based Retrieval of Facial Images," European Signal Processing Conference (EUSIPCO '00), Tampere, Finland; Sep. 2000; 18 pages.
Bakstein Hynek, et al., "Visual Fidelity of Image Based Rendering," Center for Machine Perception, Czech Technical University, 10 pages.
Boccaccio, Jeff; CEPro, "Inside HDMI CEC: The Little-Known Control Feature," http://www.cepro.com/article/print/inside_hdmi_cec_the_little_known_control_feature; Dec. 28, 2007, 2 pages.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-handed column, line 34—middle column, line 24; 3pgs.
Chen, Jason, "iBluetooth Lets iPhone Users Send and Receive Filed Over Bluetooth," Mar. 13, 2009; 1 page; http://i.gizmodo.com/5169545/ibluetooth-lets-iphone-users-send-and-receive-files-over-bluetooth.
Cisco: Bill Mauchly and Mod Marathe; UNC: Henry Fuchs, et al., "Depth-Dependent Perspective Rendering," 6 pgs.
Costa, Cristina, et al., "Quality Evaluation and Nonuniform Compression of Geometrically Distorted Images Using the Quadtree Distorion Map," EURASIP Journal on Applied Signal Processing, vol. 2004, No. 12; pp. 1899-1911; © 2004 Hindawi Publishing Corp,; XP002536356; ISSN: 1110-8657; 16 pages.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2006-59.pdf, 41 pages.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.
Diaz, Jesus, iPhone Blue-tooth File Transfer Coming Soon (YES!): Jan. 25, 2009; 1 page; http://i.gizmodo.com//5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.
"Dynamic Displays," copyright 2005-2008 [retrieved Feb. 24, 2009], http://www.zebraimaging.com/html/lighting_display.html, 2 pages.
ECmag.com, "IBS Products," Published Apr. 2009, 2 pages; http://www.ecmag.com/index.cfm?fa=article&articleID=10065.
Electrophysics Glossary, "Infrared Cameras, Thermal Imaging, Night Vision, Roof Moisture Detection," printed Mar. 18, 2010, 11 pages; http://www.electrophysics.com/Browse/Brw_Glossary.asp.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, 2005; http://www.procams.org/procams2005/papers/procams05-36.pdf; 6 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; 10 pages.
Gotchev, Atanas, "Computer Technologies for 3D Video Delivery for Home Entertainment," International Conference on Computer Systems and Technologies; CompSysTech '08; 6 pgs; http://ecet.ecs.ru.acad.bg/cst08/docs/cp/Plenary/P.1.pdf.
Gries, Dan, "3D Particles Experiments in AS3 and Flash CS3, Dan's Comments," printed May 24, 2010 http://www.flashandmath.com/advanced/fourparticles/notes.html; 3pgs.
Guernsey, Lisa, "Toward Better Communication Across the Language Barrier," Jul. 29, 1999, http://www.nytimes.com/1999/07/29/technology/toward-better-communication-across-the-language-barrier.html; 2 pages.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755; 13 pages.
Holographic Imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.
Hornbeck, Larry J., "Digital Light Processing™: A New MEMS-Based Display Technology," [retrieved Feb. 26, 2009]; http://focus.ti.com/pdfs/dlpdmd/17_Digital_Light_Processing_MEMS_display_technology.pdf, 22 pages.
"Infrared Cameras TVS-200-EX," printed May 24, 2010; 3 pgs.; http://www.electrophysics.com/Browse/Brw_ProductLineCategory.asp?CategoryID=184&Area=IS.
IR Distribution Category @ Envious Technology, "IR Distribution Category," 2 pages http://www.envioustechnology.com.au/products/product-list.php?CID=305, printed on Apr. 22, 2009.
IR Trans—Products and Orders—Ethernet Devices, 2 pages http://www.irtrans.de/en/shop/lan.php, printed on Apr. 22, 2009.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303; 16 pages.
Itoh, Hiroyasu, et al., "Use of a gain modulating framing camera for time-resolved imaging of cellular phenomena," SPIE vol. 2979, 1997, pp. 733-740; 8 pages.
Kauff, Peter, et al., "An Immersive 3D Video-Conferencing System Using Shared Virtual Team User Environments," Proceedings of the

(56) References Cited

OTHER PUBLICATIONS

4th International Conference on Collaborative Virtual Environments, XP040139458; Sep. 30, 2002; 8 pages.
Kazutake, Uehira, "Simulation of 3D image depth perception in a 3D display using two stereoscopic displays at different depths," http://adsabs.harvard.edu./abs/2006SPIE.6055.408U; 2006, 2 pgs.
Keijser, Jeroen, et al., "Exploring 3D Interaction in Alternate Control-Display Space Mappings," IEEE Symposium on 3D User Interfaces, Mar. 10-11, 2007, pp. 17-24; 8 pages.
Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp?tp=&arnumber=4455782&isnumber=4455723.
Lawson, S., "Cisco Plans TelePresence Translation Next Year," Dec. 9, 2008; http://www.pcworld.com/ article/155237/.html?ik=rss_news; 2 pages.
Miller, Gregor, et al., "interactive Free-Viewpoint Video," Centre for Vision, Speech and Signal Processing, [retrieved Feb. 26, 2009], http://www.ee.surrey.ac.uk/CVSSP/VMRG/ Publications/miller05cvmp.pdf, 10 pages.
"Minoru from Novo is the worlds first consumer 3D Webcam," Dec. 11, 2008 [retrieved Feb. 24, 2009], http://www.minoru3d.com, 4 pages.
Mitsubishi Electric Research Laboratories, copyright 2009 [Retrieved Feb. 26, 2009], http://www.merl.com/projects/3dtv, 2 pages.
National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.
OptoIQ, "Anti-Speckle Techniques Uses Dynamic Optics," Jun. 1, 2009, 2 pages; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html.
OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daliy-product-2/2009/01/smart-camera-supports-multiple-interfaces.html.
OptoIQ, "Vision + Automation Products—VideometerLab 2," 11 pgs.; http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml.
OptoIQ, "Vision Systems Design—Machine Vision and Image Processing Technology," printed Mar. 18, 2010, 2 pages; http://www.optoiq.com/index/machine-vision-imaging-processing.html.
PCT "Notification of Transmittal of Opinion of the International Searching Report and the Written Opinion of the International Searching Authority, or the Declaration," PCT/US2009/001070, dated Apr. 8, 2009, 17 pages.
PCT Notification of Transmittal of the International Search Report and the Written Opinion of the International Searching Authority, or the Declaration; PCT/US2009/038310; dated Oct. 10, 2009; 19 pages.
Radhika, N., et al., "Mobile Dynamic recofigurable Context aware middleware for Adhoc smart spaces," vol. 22, 2008, 3 pages http://www.acadjournal.com/2008/V22/part6/p7.
"Rayvel Business-to-Business Products," copyright 2004 [retrieved Feb. 24, 2009], http://www.rayvel.com/b2b.html, 2 pages.
"Robust Face Localisation Using Motion, Colour & Fusion" Dec. 10, 2003; Proc. VIIth Digital Image Computing: Techniques and Applications, Sun C. et al (Eds.), Sydney; 10 pgs.; Retrieved from the internet: http://www.cmis.csiro.au/Hugues.Talbot/dicta2003/cdrom/pdf/0899.pdf; pp. 899-908, XP007905630.
School of Computing, "Bluetooth over IP for Mobile Phones," 1 page http://www.computing.dcu.ie/wwwadmin/fyp-abstract/list/fyp...details05.jsp?year=2005&number=51470574.
Sena, "Industrial Bluetooth," 1 page http://www.sena.com/products/industrial_bluetooth, printed on Apr. 22, 2009.
Shaffer, Shmuel, "Translation—State of the Art" presentation; Jan. 15, 2009; 22 pages.
Shi, C. et al., "Automatic Image Quality Improvement for Videoconferencing," IEEE ICASSP © 2004, 4 pgs.
SMARTHOME, "IR Extender Expands Your IR Capabilities," 3 pages http://www.smarthome.com/8121.html, printed Apr. 22, 2009.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; pp. 78-88; XP007905596; 11 pgs.
"Super Home Inspectors or Super Inspectors," printed Mar. 18, 2010, 3 pages; http://www.umrt.com/PageManager/Default.aspx/PageID=2120325.
Total immersion, Video Gallery, copyright 2008-2009 [retrieved Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers/VidReg-final.pdf.
Tsapatsoulis, N., et al., "Face Detection for Multimedia Applications," Proceedings of the ICIP '00; Vancouver, BC, Canada; Sep. 2000; 4 pages.
Tsapatsoulis, N., et al., "Face Detection in Color Images and Video Sequences," $10^{th}$ Mediterranean Electrotechnical Conference (MELECON), 2000; vol. 2; pp. 498-502; 21 pgs.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628; 26 pgs.
Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.
WirelessDevNet, Melody Launches Bluetooth Over IP, http://www.wirelessdevnet.com/news/2001/ 155/news5.html; 2 pages, printed on Jun. 5, 2001.
WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.
Yang, Jie, et al., "A Real-Time Face Tracker," Proceedings $3^{rd}$ IEEE Workshop on Applications of Computer Vision; 1996; Dec. 2-4, 1996; pp. 142-147; 6 pgs.
Yang, Ming-Hsuan, et al., "Detecting Faces in Images: A Survey," vol. 24, No. 1; Jan. 2002; pp. 34-58; 25 pgs.
Yang, Ruigang, et al., "Real-Time Consensus-Based Scene Reconstruction using Commodity Graphics Hardware," Department of Computer Science, University of North Carolina at Chapel Hill, 10 pgs.
Yoo, Byounghun, et al., "Image-Based Modeling of Urban Buildings Using Aerial Photographs and Digital Maps," Transactions in GIS, vol. 10 No. 3, p. 377-394, 2006; 18 pages [retrieved May 17, 2010], http://icad,kaist.ac.kr/publication/paper_data/image_based.pdf.
U.S. Appl. No. 13/036,925, filed Feb. 28, 2011 ,entitled "System and Method for Selection of Video Data in a Video Conference Environment," Inventor(s) Sylvia Olayinka Aya Manfa N'guessan.
U.S. Appl. No. 13/096,772, filed Apr. 28, 2011, entitled "System and Method for Providing Enhanced Eye Gaze in a Video Conferencing Environment," Inventor(s): Charles C. Byers.
U.S. Appl. No. 13/106,002, filed May 12, 2011, entitled "System and Method for Video Coding in a Dynamic Environment," Inventors: Dihong Tian et al.

(56) References Cited

OTHER PUBLICATIONS

U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Boros, S., "Policy-Based Network Management with SNMP," Proceedings of the EUNICE 2000 Summer School Sep. 13-15, 2000, p. 3.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.
EPO Aug. 15, 2011 Response to EPO Communication mailed Feb. 25, 2011 from European Patent Application No. 09725288.6; 15 pages.
EPO Communication dated Feb. 25, 2011 for EP09725288.6 (published as EP22777308); 4 pages.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.

\* cited by examiner

TRACKING AN OBJECT UTILIZING LOCATION INFORMATION ASSOCIATED WITH A WIRELESS DEVICE

FIELD

The present disclosure relates generally to tracking and surveillance of an object.

BACKGROUND

Fixed video and stills cameras may be used for monitoring an object such as a person within given coverage or monitored area. Examples include security cameras mounted in and about buildings which are monitored by security guards. Other cameras may incorporate controllable movement so that a security guard may track an object, for example to follow a person of interest moving about a building. Various surveillance systems are available to detect an object, for example by detecting movement or scene changes. The object may then be tracked or otherwise monitored using fixed and/or moveable cameras.

OVERVIEW

In particular embodiments a method of tracking an object carrying a wireless location device is provided. The method comprises recording and storing images from a plurality of cameras corresponding to respective coverage areas having predetermined locations, and determining location information associated with the wireless location device, the location information corresponding to one or more of the coverage areas. The method further comprises determining which of the images correspond to the location information, and retrieving these images.

In particular embodiments a system for tracking an object carrying a wireless location device is provided. The system comprises a plurality of cameras arranged to record images from respective coverage areas having predetermined locations, an image server coupled to the cameras and arranged to store the images recorded by the cameras, a location server arranged to determine and store location information associated with the wireless location device, the location information corresponding to one or more of said coverage areas, and a tracking server arranged to determine which of the images from the image server correspond to the location information, and to retrieve these images.

In particular embodiments a method of surveillance of an object is provided. The method comprises receiving a surveillance request comprising a surveillance time window, determining location information associated with the object over this surveillance time window, the location information corresponding to two or more coverage areas having predetermined locations, retrieving images of the two or more coverage areas which correspond to the location information over the surveillance time window, and displaying the images retrieved.

In particular embodiments a tracking server for tracking an object carrying a wireless location device is provided. The tracking server comprises a processor arranged to determine location information associated with the object over a surveillance time window in response to receiving a surveillance request comprising said surveillance time window. The location information corresponds to two or more coverage areas having predetermined locations. The processor is further arranged to retrieve images of the two or more coverage areas which correspond to the location information over the surveillance time window.

BRIEF DESCRIPTION OF THE DRAWINGS

Embodiments are described with reference to the following drawings, by way of example only and without intending to be limiting, in which.

DESCRIPTION OF EXAMPLE EMBODIMENTS

Figure 1:
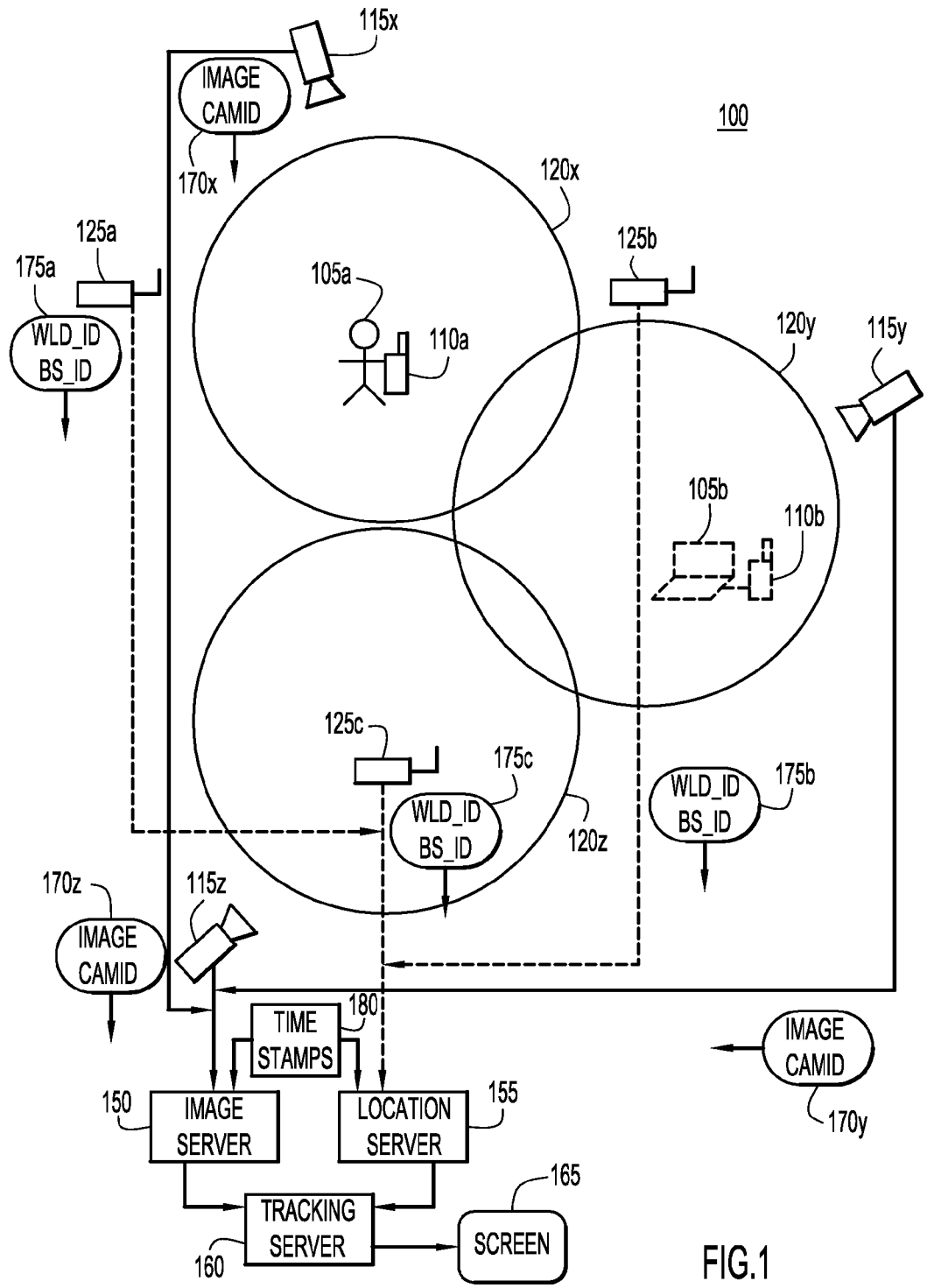
FIG. 1 illustrates an example system for tracking an object.

Referring to FIG. 1, a system for tracking an object according to an example embodiment is shown. The system 100 comprises a plurality of cameras 115$x$, 115$y$, 115$z$ each recording images of respective coverage areas 120$x$, 120$y$, 120$z$. The coverage areas 120$x$-120$z$ may be any suitable size or sizes, each coverage area has a fixed known or predetermined location, and they may or may not overlap each other. Together, the coverage areas form a surveillance region. The cameras 115$x$-115$z$ may be video cameras, stills cameras periodically recording images, webcams or any other suitable image recording device. The system 100 also comprises a plurality of base stations 125$a$, 125$b$, 125$c$ which each have a respective predetermined or known location. The system further comprises an image server 150 coupled to the cameras 115$x$-115$z$, a location server 155 coupled to the base stations 125$a$-125$c$, a tracking server 160 coupled to the image server 150 and the location server 155, and to a display screen 165. A timestamp generator 180 is also shown separately being coupled to the image server 150 and location server 155 for simplicity of explanation, however this functionality may be implemented within the image server 150 and location server 155 using internal clocks and processing and storage techniques that would be appreciated by those skilled in the art.

The system 100 is used to track one or more objects 105$a$, 105$b$ through the surveillance region. The objects may include a person (105$a$), a notebook computer (105$b$), an artwork, or any moveable object. Each object carries a respective wireless location device 110$a$, 110$b$, for example in a pocket of a person (105$a$) or integrated within a notebook computer (105$b$). The wireless location devices 110$a$, 110$b$ may be radio frequency identity tags (RFID), or any wireless device such as a mobile phone which can be configured to communicate with the system in order to enable location information associated with the device to be determined.

The cameras 115$x$-115$z$ periodically record images of their respective coverage areas 120$x$-120$z$ which may or may not include an object 105$a$, 105$b$, and forward these recorded images together with a respective camera identifier (CamID) to the image server 150. For example each recorded image may be sent as an image file and associated camera identifier (170$x$, 170$y$, 170$z$). The cameras 115$x$-115$z$ and image server 150 may be coupled using a local area network, coaxial cable or any other suitable mechanism as would be appreciated by those skilled in the art. The image server 150 timestamps the received image file and camera identifier (170*x*, 170*y*, 170*z*) using a suitable timestamp such as a time from a common clock (180) also used by the location server 155 or an internal clock sufficiently synchronized with a corresponding internal clock within the location server 155. The time-stamped image files and camera identifiers are then stored on the image server 150.

FIG. 1 shows a first object 105*a* in coverage area 120*x* at the same time as a second object 105*b* in coverage area 120*y*, images of both these objects 105*a*, 105*b* being recorded in the image server 150 together with their correspondence to a particular coverage area 120*x*, 120*y*. In this embodiment, correspondence to a particular coverage area is implemented using a respective camera identifier.

The base stations 125*a*-125*c* periodically determine location information associated with the wireless location devices 110*a*, 110*b*, for example by identifying near-by wireless location devices 110*a*, 110*b* and measuring the signal strength of signals received from these identified wireless location devices. The wireless location devices 110*a*, 110*b* are configured to periodically transmit their own unique device identifier (WLD_ID). The signal strength of this signal from the wireless location devices can then be measured by receiving base stations 125*a*-125*c* as will be appreciated by those skilled in the art. This signal strength measurement can then be used as a proxy for range or distance between the wireless location device 110*a*, 110*b* and the respective base station 125*a*-125*c*. If the wireless location device signal is picked up by a number of base stations 125*a*-125*c*, then the relative measured signal strengths from each base station can be used to determine the relative position of the wireless location devices 110*a*, 110*b* using triangulation as will also be appreciated by those skilled in the art. By knowing the locations of the base stations 125*a*-125*c*, the estimated positions of the wireless location devices 110*a*, 110*b* can then be estimated. Various system configurations will be available to those skilled in the art in order to coordinate the activities of the base stations 125*a*-125*c* and wireless location devices 110*a*, 110*b*, for example in order to ensure that the base stations are listening for the wireless location device signal transmissions at the right time. This may be achieved for example by arranging the base stations to periodically transmit a common beacon signal to which each of the wireless location devices 110*a*, 110*b* is configured to respond.

The base stations 125*a*-125*c* are typically located in and around the coverage areas 120*x*-120*z* so that each coverage area may be "observed" by at least three base stations 125*a*-125*c*. In other words, if an object (105*a*) and hence a respective wireless location device (110*a*) are located in a coverage area (120*x*), then at least three base stations (125*a*, 125*b*, 125*c*) would normally receive and be able to measure the signal strength of signals from that wireless location device (110*a*).

The base stations 125*a*-125*c* forward the wireless location device (110*a*, 110*b*) identifiers (WLD_ID) and their respective signal strength measures to the location server 155, together with their respective base station identifiers (BS_ID). This location information 175*a*-175*c* is received by the location server 155 and corresponds to one or more of the coverage areas 120*x*-120*z*. In other words, because the locations of the base stations 125*a*-125*c* are known and positioned around the coverage areas 120*x*-120*z*, the positions of the wireless location devices 110*a*, 110*b* can be estimated and "located"within or near-by one of the coverage areas 120*x*-120*z*. The location information 175*a*-175*c* can therefore include the wireless location device (110*a*, 110*b*) identifiers (WLD_ID), their respective signal strengths, and the base station identifier (BS_ID) of the base station 125*a*-125*c* that received the signal from the wireless location device 110*a*, 110*b*. Further location information may include the locations of the respective base stations 125*a*-125*c*, received signal angle-of-arrival information, received signal time-of-arrival information, global positioning satellite (GPS) co-ordinates from the wireless location devices 110*a*, 110*b*.

The base stations 125*a*-125*c* may be coupled to the location server 155 by a local area network (LAN) or any other suitable mechanism. A common LAN (not shown) may be used for coupling the base stations 125*a*-125*c* and location server 155, as well as the cameras 115*x*-115*z* and image server 150.

The location information received by the location server 155 may simply be time-stamped and stored, for example using the time-stamp functionality 180 used by the image server 150. Alternatively, the location server may further process this location information in order to determine further location information; for example by estimating a position for each wireless location device 110*a*, 110*b*. This position estimating may be implemented using the known locations of the base stations 125*a*-125*c* which received a signal from the respective wireless location devices 110*a*, 110*b*, together with the respective signal strengths of these signals. For example, taking the first object 105*a* in FIG. 1, the wireless location device 110*a* is located within coverage area 120*x*. Signals from this wireless location device 110*a* are received by base stations 125*a*, 125*b*, 125*c*, each at varying signal strengths dependent on distance. Base station 125*a* forwards location information 175*a* to the location server comprising the base station's identifier (BS_ID) together with the wireless location device identifier (WLD_ID) received from the wireless location device 110*a*, and the signal strength at which this received signal was measured. Similar location information 175*b*, 175*c* is also received by the location server 155 from base stations 125*b*, 125*c*. This location information 175*a*-175*c* may also include the identifiers and respective signal strengths from other wireless location devices 110*b*. The location server 155 then uses triangulation to determine a relative position for the wireless location device 110*a*, that is relative to the three base stations 125*a*-125*c*. Knowing the locations of these base stations 125*a*-125*c*, the location server 155 can then determine an actual or estimated position for the wireless location device 110*a* and which is located in or otherwise corresponds to one of the coverage areas. The location server 155 may then associate the wireless location device 110*a* with the corresponding coverage area (120*x*) and timestamp and store this location information. Or the estimated location may be time-stamped together with the wireless location device's identifier and stored. Thus the location server 155 is able to locate each of the wireless location devices 110, 110*b*, over time, and hence the objects 105*a*, 105*b* carrying them.

The system 100 of this embodiment therefore provides time-stamped images of each coverage area 120*x*-120*z* as well as time-stamped location information for each object 105*a*, 105*b*, this location information corresponding to one or more of the coverage areas. This allows the tracking server 160 to track a selected object 105*a* through the coverage areas over time, and hence to retrieve images of that object. Thus given a surveillance time window, the tracking server 160 can determine from the location server the location information of the selected object 105*a* over that surveillance time window. This location information may simply comprise the coverage area 120*x*-120*z* in which the wireless location device 110*a* carried by the selected object 105*a* was located at each of a number of time intervals within the surveillance time window. Alternatively, this coverage area information may be determined from other location information stored within the location server 155, for example wireless location device 110*a* identifiers, corresponding signal strengths and associated base station locations. Once the coverage areas 120*x*-120*z* and the respective time intervals during which the wireless location device 110*a* was located in each coverage area are determined, images corresponding to those coverage areas 120*x*-120*z* at those time intervals can be requested from the image server 150. The sequence of coverage areas over the surveillance time window can then be displayed on the screen 165 in order to track the object 105*a*.

The system of this embodiment may be used for many applications, for example tracking a lost child in an amusement park or other crowded public area or tracking a notebook computer which has been removed from its last known position. More generally, embodiments may be used for security surveillance, inventory tracking in enterprises, and any application that requires video surveillance.

In alternative embodiments, the wireless location devices 110*a*, 110*b* may be arranged to simply forward their estimated coordinates to the location server 155, without the need for signal strength measuring at base stations having known locations. For example the wireless location devices 110*a*, 110*b* may incorporate GPS functionality and periodically forward their respective GPS coordinates to the location server 155 using a cellular network, or using WLAN base stations whose location is not required. In another example the wireless location devices 110*a*, 110*b* may estimate their locations using signals received from base stations having known locations, and forward this location information to the location server 155. In yet a further example, a base station may be positioned within each coverage areas 120*x*-120*z* such that when a wireless location device hands-off from one base station to another, it can be determined that the wireless location device has also moved from one coverage area to another—the locations of the base stations or their correspondence with the coverage areas being known.

In further alternative embodiments, the image server 150, location server 155, tracking server 160, screen 165, and time-stamp function 180 may be implemented in a single computer system, or distributed in any suitable manner as would be appreciated by those skilled in the art. Furthermore, the functionality implemented in the image server 150, location server 155, and tracking server 165 may be combined or distributed differently in other apparatus.

Figure 2:
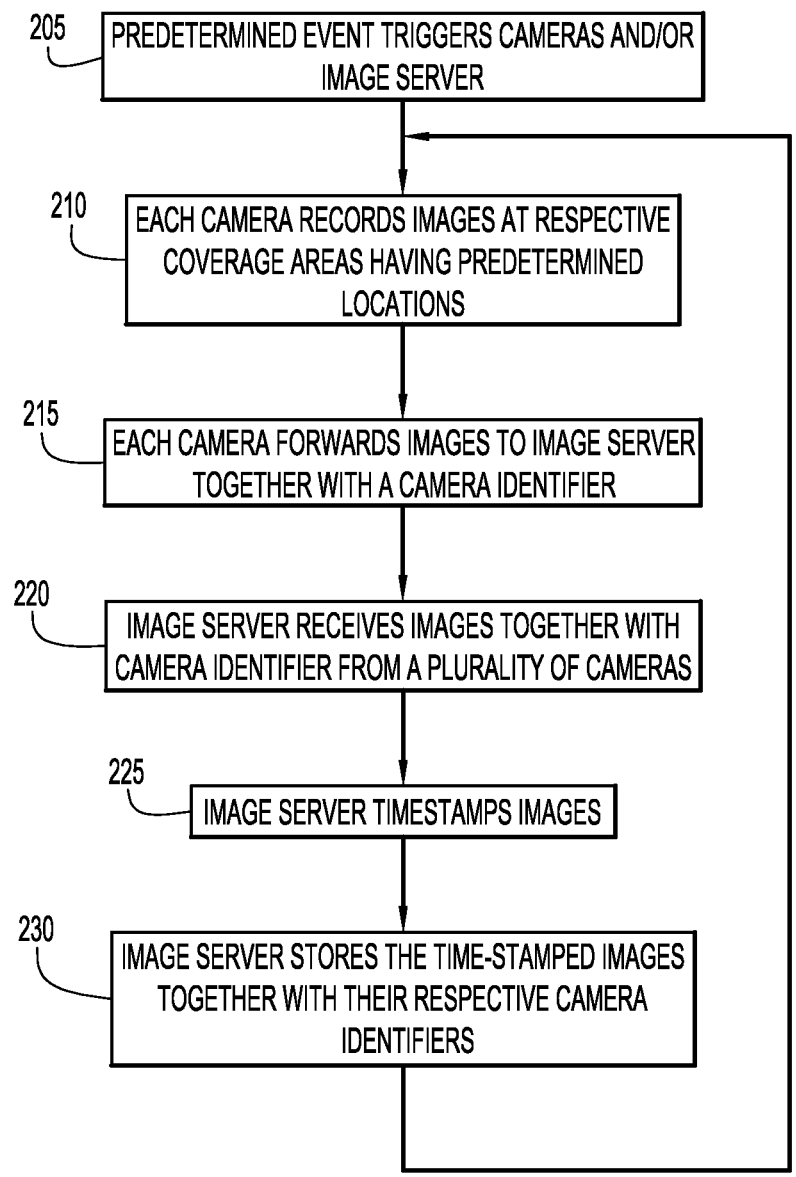
FIG. 2 illustrates an example method of recording and storing images.

Referring now to FIG. 2, a method of recording and storing images from a plurality of cameras corresponding to respective coverage areas is shown. This method 200 may be implemented by the cameras 115*x*-115*z* and image server 150 of FIG. 1, however it should be understood that the method is not limited to being performed on these apparatus. Additionally, whilst the method indicates a particular order of steps, in other embodiments the steps could be ordered differently, and/or the steps could be modified or removed. The cameras (115*x*-115*z*) and image server (150) may be continuously recording and storing images, however in order to save storage space this recording and/or storing may only be started in response to predetermined events or other triggers as indicated at step 205. This step is described in more detail later, and for the moment, it is assumed that the cameras and image server are continuously recording and storing images. Thus each camera (115*x*-115*z*) records images of a respective coverage area (120*x*-120*z*) at step 210. The coverage areas have predetermined locations, and the images may be recorded periodically, for example every second. Once an image has been recorded, each camera (115*x*-115*z*) forwards the image together with a camera identifier to the image server (150) at step 215. The recorded image may be forwarded as any suitable image file such as any of the available JPEG (Joint Photographic Experts Group) or MPEG (Moving Pictures Expert Group) standards. The camera identifier can be any suitable identifier which is unique within the system (100).

The image server (150) receives the recorded images and camera identifiers from a plurality of cameras (115*x*-115*z*) at step 220. Thus the image server 150 receives images of a plurality of fixed or known location coverage areas (120*x*-120*z*) over time. The image server (150) then timestamps these image files (and camera identifiers) at step 225. This step may be implemented using timestamp signals received from a time-stamping function (180) also used by the location server (155), however the time-stamping function does not require a high degree or tolerance given the speed of the objects (105*a*, 105*b*), typically people or objects carried by people, moving about within the coverage areas (120*x*-120*z*). The image server then stores the time-stamped image files and camera identifiers at step 230. Given the large size of image files, reduced resolution images or reduced frequency of recorded images may be used in order to reduce the storage requirements in some implementations. Similarly, images may only be stored when a wireless location device (110*a*, 110*b*) has been determined to be within the coverage area as will be described in more detail below.

Figure 3:
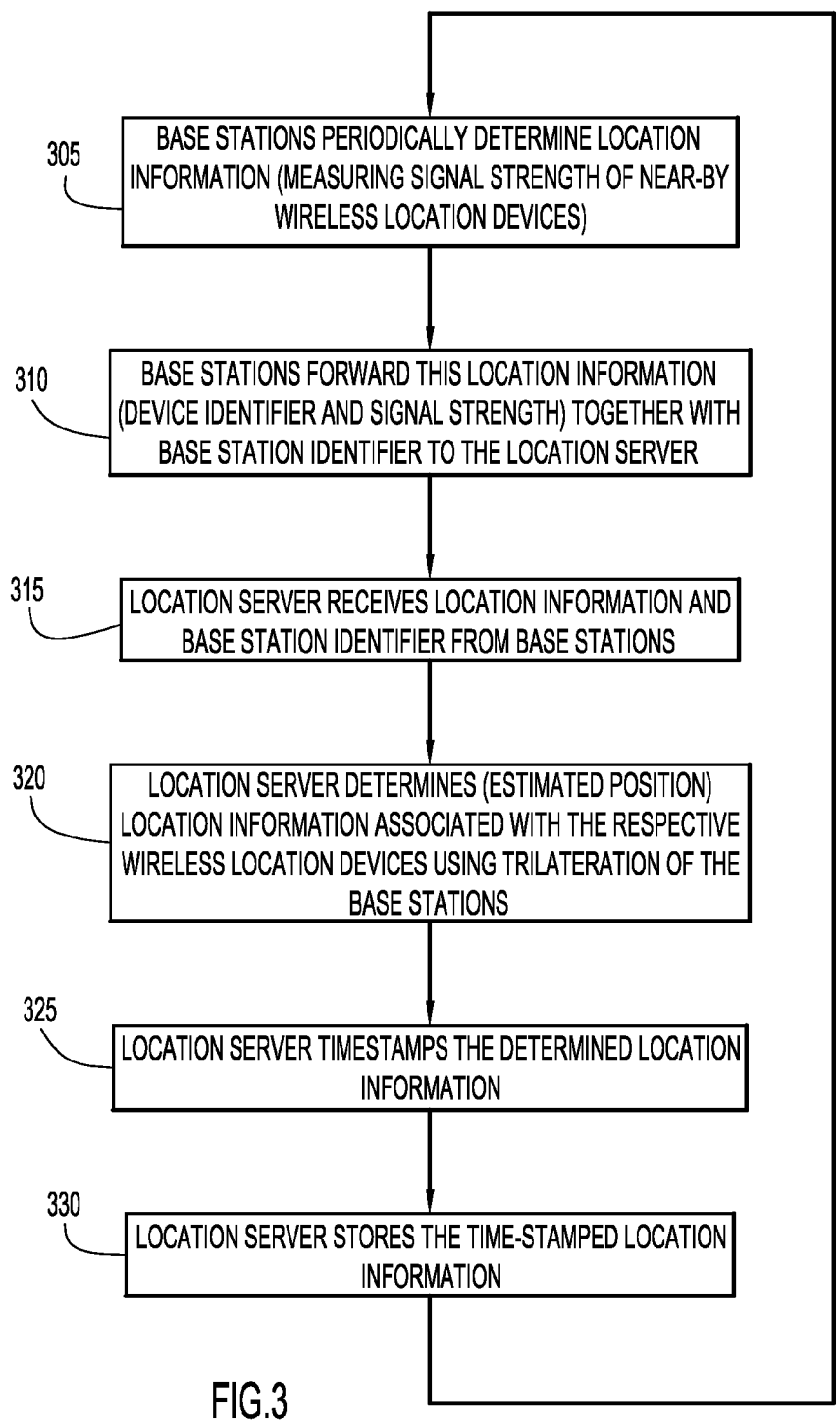
FIG. 3 illustrates an example method of determining location information associated with the object.

Referring now to FIG. 3, a method of determining location information associated with wireless location devices and corresponding to one or more of the coverage areas is shown. This method 300 may be implemented by the wireless location devices 110*a*, 110*b*, base stations 125*a*-125*c* and location server 155 of FIG. 1, however it should be understood that the method is not limited to being performed on these apparatus. Additionally, whilst the method indicates a particular order of steps, in other embodiments the steps could be ordered differently, and/or the steps could be modified or removed. Each base station (125*a*-125*c*) periodically determines location information in the form of wireless location device identifiers and corresponding signal strength measurements at step 305. Each base station may receive signals from a number of wireless location devices (110*a*, 110*b*), each signal carrying the identifier for the respective device. The signal strength for each received signal can be measured in various ways, for example using the RSSI (received signal strength indication) parameter. Thus each base station may determine a number of device identifiers and respective signal strength measurements periodically, for example once every second. Each base station forwards any wireless device identifiers and signal strength measurements it has determined to the location server at step 310. This forwarded location information (175*a*-175*c*) also includes an identifier for the base station (125a-125c) which uniquely identifies the base station within the system (100). The location server (155) receives this location information (wireless location device identifier(s) and respective signal strength measurements, base station identifier(s)) at step 315.

The location server (155) then determines further location information associated with the wireless location devices (110*a*, 110*b*) which corresponds to one or more of the coverage areas (120*x*-120*z*) at step 320. For each wireless location device (110*a*), the location server (155) may identify a signal strength measurement and a corresponding base station location from the base station identifier, and estimate the position of the device (110*a*) using trilateration, triangulation or any other suitable locating method as would be appreciated by those skilled in the art. The estimated position will typically correspond to the predetermined locations of one of the coverage areas, in other words the estimated position is within one of the coverage areas. The location server then timestamps the determined location information (in this example the estimated position) at step 325. This step may be implemented using timestamp signals received from a time-stamping function (180) also used by the image server (150), however an internal clock will typically be adequate. The location server (155) then stores the determined location information at step 330. Whilst the determined location information has been described in this embodiment as an estimated position, or base station locations together with wireless location device signal strengths, the location information could simply be an identifier for the coverage area corresponding to the estimated position of the wireless location device.

Figure 4:
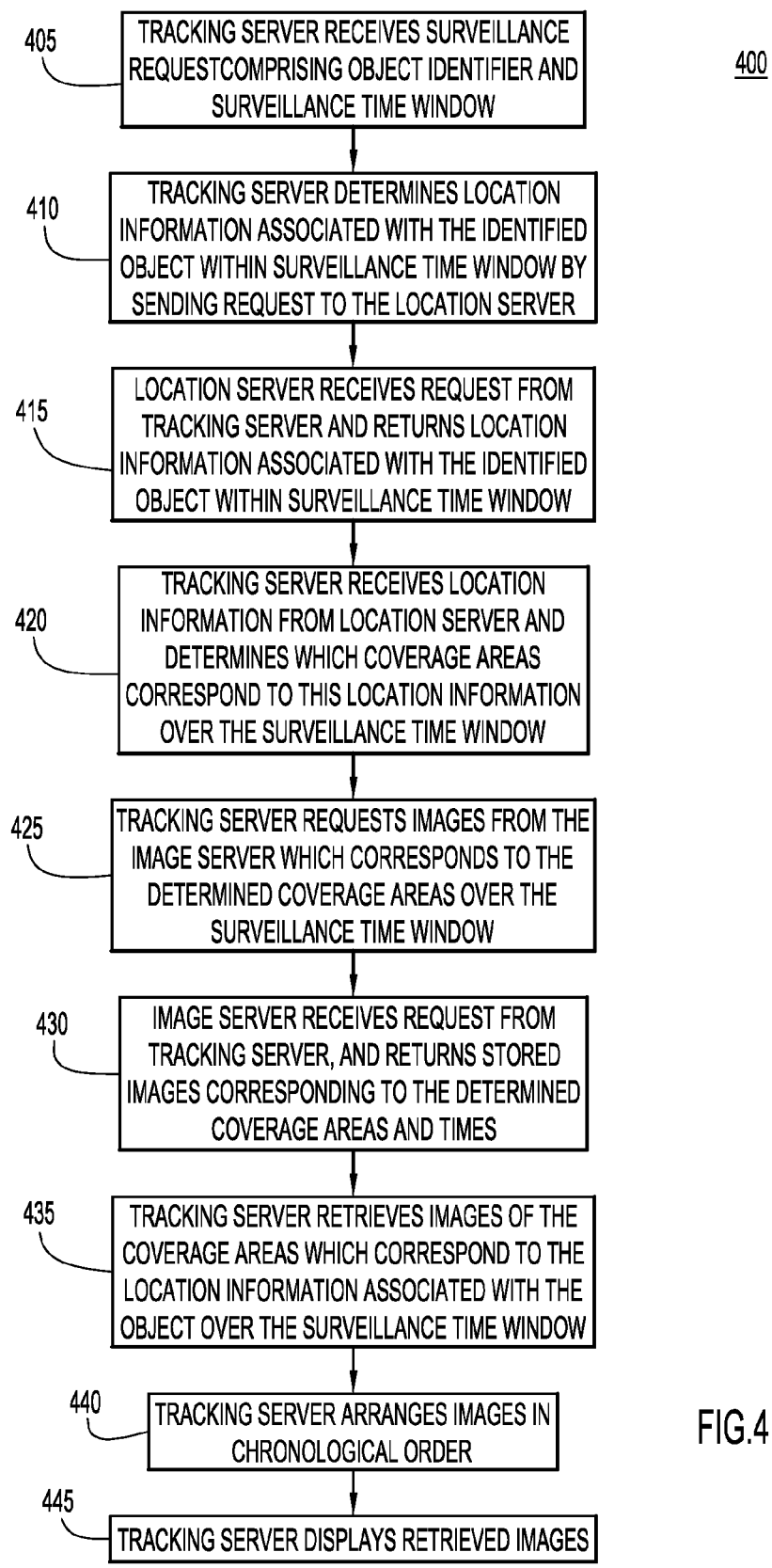
FIG. 4 illustrates an example method of retrieving surveillance images of the object.

Referring now to FIG. 4, a method of surveillance of an object is shown. This method 400 may be implemented by the tracking server 160, location server 155, and image server 150 of FIG. 1, however it should be understood that the method is not limited to being performed on these apparatus. Additionally, whilst the method indicates a particular order of steps, in other embodiments the steps could be ordered differently, and/or the steps could be modified or removed. The tracking server (160) initially receives a surveillance request at step 405. The surveillance request includes an object identifier and a surveillance time window. The object identifier corresponds to or is the same as one of the identifiers of the wireless location devices (110*a*, 110*b*) which uniquely identifies each wireless location device within the system. The surveillance time window is simply a duration having a start time and an end time over which the identified or selected object is to be tracked. The tracking server (160) then determines location information associated with wireless location device (110*a*) associated with the identified object (105*a*) over the surveillance time window by requesting this location information from the location server (155) at step 410. The location server (155) receives this request from the tracking server (160), and returns the location information for the identified wireless location device (110*a*) over the requested times to the tracking server at step 415. In the example embodiment, this location information as determined by the method (300) of FIG. 3 is the estimated location of the wireless location device (110*a*) for every second of the surveillance time window; however other time intervals could alternatively be used The tracking server (160) receives this location information and determines which coverage areas (120*x*-120*z*) each location information corresponds to at each time interval at step 420. The correspondence between the location information and the coverage areas is available using the predetermined locations of the coverage areas (120*x*-120*z*). The tracking server (160) then requests images from the image server (150) which correspond to the determined coverage areas and respective time intervals at step 425. The requested times correspond to the timestamps used by the location server 155, and also in some embodiments by the image server (150). The image server (150) receives these requested coverage areas and respective time intervals from the tracking server (160) and returns the corresponding recorded and stored images at step 430. The image server may implement this step by matching the requested coverage areas with respective camera identifiers and search for image files having these camera identifiers and the requested time intervals. The tracking server (160) retrieves these images from the image server (150) at step 435. The retrieved image files are recorded images of the coverage areas corresponding to the location information of the identified object at each time interval over the surveillance time window. The tracking server (160) may arrange the received images into chronological order at step 440, for example using the timestamps associated with each image. The images of the coverage areas (120*x*-120*z*) traversed by the object (105*a*) are then displayed on the display screen by the tracking server at step 445. Thus the object (105*a*) can be tracked over the surveillance time window by viewing the images of the coverage areas showing the object. For example a lost child can be tracked or viewed as he or she moves around an amusement park to determine whether the child has just got lost or been abducted.

The tracking server 160 may additionally be arranged to display images from the coverage area in which an object is currently located. This may be implemented by interrogating the location server on the latest location information for the identified object and wireless location device, and requesting images from the image server of the coverage area corresponding to that location information. Indeed a direct feed from the camera 115*x*-115*z* associated with the coverage area may be displayed on the screen 165.

Figure 5A:
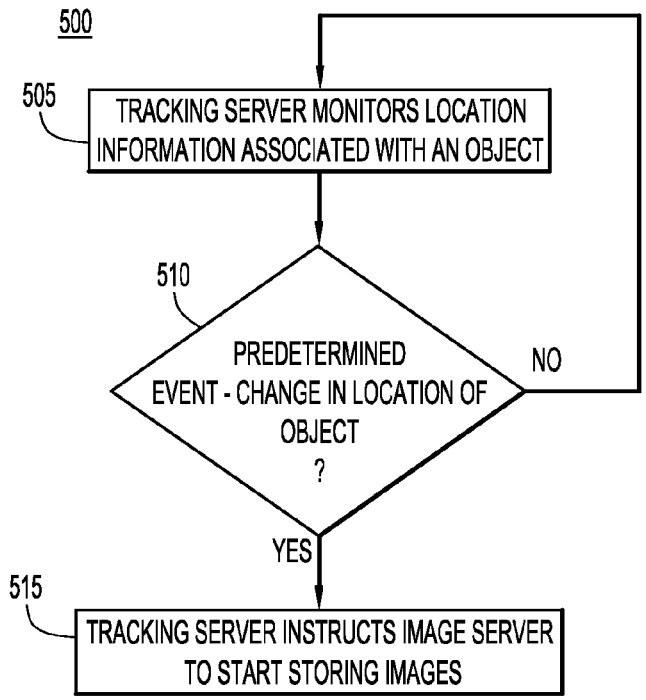
FIG. 5A illustrates an example method of triggering storing of images of the object.

Referring now to FIG. 5A, a method of triggering the image server to start recording images in response to a predetermined event is shown. This method 500 may be implemented by the tracking server 160 and the image server 150 of FIG. 1, however it should be understood that the method is not limited to being performed on these apparatus. Additionally, whilst the method indicates a particular order of steps, in other embodiments the steps could be ordered differently, and/or the steps could be modified or removed. The tracking server (160) monitors location information associated with an object at step 505. This step may be implemented by periodically requesting the latest location information for a wireless location device (110*a*) associated with an identified object (105*a*). This step may also involve the processing of the location information, for example to calculate an estimated position for the object if this has not already been done, and/or to determine the coverage area which the object is currently located in. The tracking server (160) then determines whether there has been a change in location of the object at step 510. This predetermined event, the change in object location, may correspond to a change in coverage area, as determined from the latest location information. If no change in location has been detected (510N), then the tracking server returns to monitoring the location information of the object. However if a location change is detected (510Y), then the tracking server instructs the image server (150) to start storing images at step 515. The instruction to start storing images may only relate to the overage area to which the object has moved, or it may relate to all coverage areas. The instruction is received by the image server (150) at step 205 of method 200 illustrated in FIG. 2. The image server (150) then proceeds to implement the rest of method 200.

Whilst the embodiment has been described with respect to one object, it may be implemented with respect to many such objects, so that whenever the predetermined location of one of these objects changes, the storing of images is triggered.

In an example implementation, a notebook computer (105*b*) may have a normal or predetermined location which may or may not be within one of the coverage areas (120*x*-120*y*). When the notebook is removed from this predetermined location, the system (100) is configured by methods 500 and 200 to start recording images of the coverage areas in order to enable tracking of the notebook computer. Thus images of the notebook computer (105*b*) may be used to determine whether the notebook computer was legitimately moved by an authorized person, or has been stolen. If the notebook computer has been stolen, then the thief may be tracked on through the coverage areas, and perhaps their identity determined manually or by the public release of suitable images of the thief.

Figure 5B:
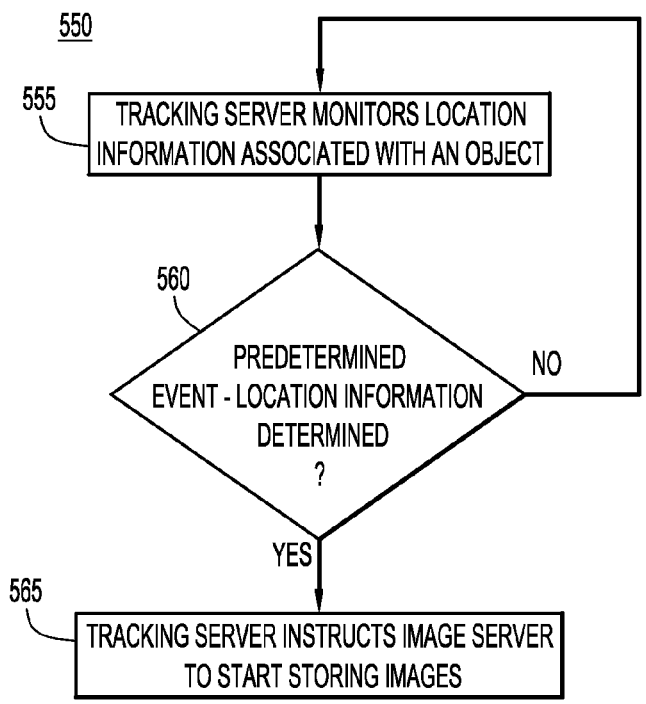
FIG. 5B illustrates another example method of triggering storing of images of the object.

Another method of triggering the image server to start recording images in response to a predetermined event is shown in FIG. 5B. This method 550 may be implemented by the tracking server 160 and the image server 150 of FIG. 1, however it should be understood that the method is not limited to being performed on these apparatus. Additionally, whilst the method indicates a particular order of steps, in other embodiments the steps could be ordered differently, and/or the steps could be modified or removed. The tracking server (160) monitors location information associated with an object at step 555. This step is similar to step 505 from method 500, and may be implemented by periodically requesting the latest location information for a wireless location device (110*a*) associated with an identified object (105*a*). This step may also involve the processing of the location information, for example to calculate an estimated position for the object if this has not already been done, and/or to determine the coverage area which the object is currently located in. The tracking server (160) then determines whether location information has been determined at step 510. This predetermined event, the start of location information, may correspond to a wireless location device (110*a*) moving into range of a base station (125*a*-125*c*) or moving into a coverage area. It may be that the location server (155) has no location information on the identified object (and hence wireless location device 110*a*) until this time, or that the location of the object does not correspond with a coverage area (120*x*-120*z*) until this time. If no location information is received on the wireless location device (and hence object 105*a*) or the location information does not correspond with a coverage area, (560N), then the tracking server returns to monitoring the location information of the object. However if location information (or its correspondence with a coverage area) is detected (560Y), then the tracking server instructs the image server (150) to start storing images at step 565. As with step 515 from method 500, the instruction to start storing images may only relate to the coverage area to which the object has moved into, or it may relate to all coverage areas. The instruction is received by the image server (150) at step 205 of method 200 illustrated in FIG. 2. The image server (150) then proceeds to implement the rest of method 200.

Whilst the embodiment has been described with respect to one object, it may be implemented with respect to many such objects, so that whenever one of the objects is detected within one of the coverage areas, the storing of images is triggered. Alternatively, storing of images of each of the coverage areas may be triggered by independently by the detection of one of a number of objects within the respective coverage area. Such an arrangement reduces the storage space required for the image files, as only images of one or more predetermined objects are stored. Furthermore, in addition or alternatively, the camera or the respective coverage areas may be arranged to start recording in response to the trigger instructions from the tracking server. In a further arrangement, recording and/or storing of images for a coverage area may be stopped when no objects are detected within the coverage area.

In an example implementation, a person (105*a*) such as a child in an amusement arcade may receive an RFID tag on a wrist-band when entering. The storing of images from a particular camera may then be triggered upon detection of the child within a corresponding coverage area. In other words, location information associated with the RFID tag (110*a*) and recorded in the location server (155) is monitored to determine when it corresponds with a coverage area (120*x*). The image server (150) is then instructed to store images received from the camera (115*x*) corresponding to the coverage area (120*x*) which the child (105*a*) has just entered. Storing of images of the child in different coverage areas may then be triggered as the child enters these areas. Similarly storing of images from other coverage areas may also be triggered when different children enter them. Thus even though there is not continuous image recording of all coverage areas, there is continuous image recording of all objects.

Figure 6:
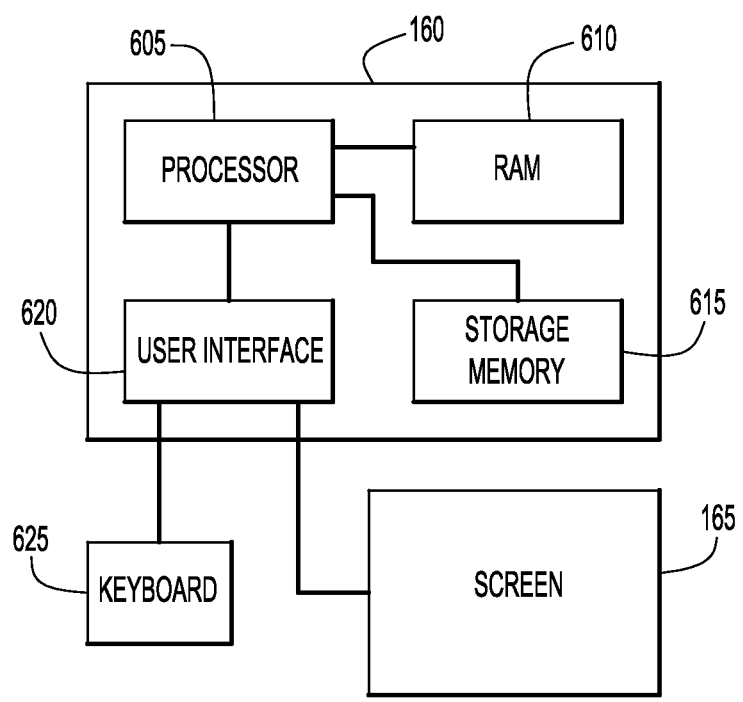
FIG. 6 illustrates an example tracking server for use with the system of FIG. 1.

Referring now to FIG. 6, a more detailed schematic of an example tracking server is shown. This tracking server 160 may implement the method 400 of FIG. 4, the method 500 of FIG. 5A, and/or the method 550 of FIG. 5B. However it should be understood that the tracking server is not limited to performing these methods and may perform surveillance and/ or image recording triggering methods according to other embodiments. Additionally, whilst the tracking server 160 of FIG. 6 indicates a particular arrangement of component parts, in other embodiments the component parts could be arranged differently, and/or the component parts could be modified or replaced. The tracking server 160 comprises a processor 605, a working memory 610 such as RAM, storage memory 615 such as a hard-disk drive, and a user interface 620 for coupling to user interface devices. These user interface devices include a keyboard 625 from which the user interface 620 receives instructions and/or data from a user of the tracking server 160, as well as a display screen 165 to which the user interface 620 forwards instructions, images and/or data to the user. Thus a user may enter a surveillance time window and an object identifier using the keyboard, and view images of the identified object over the surveillance time window on the display screen. The tracking server 160 may be implemented on a suitably configured personal computer (PC) for example, or other arrangements of computing apparatus.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For some applications embodiments of the invention may be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
recording and storing still images on an image server from a plurality of still cameras corresponding to respective coverage areas having predetermined locations, wherein the still cameras record the still images at periodic intervals, wherein recording and storing the still images is automatically initiated in response to a predetermined event such that no recording and storing of the still images occurs prior to the predetermined event;
determining, storing and timestamping location information associated with a wireless location device carried by an object, the location information corresponding to one or more of the coverage areas, wherein the location information is determined based at least upon a determined distance of the wireless location device from one or more base stations;
in response to a surveillance request comprising a surveillance time window associated with the object that includes a time period prior to a current time period, determining which timestamped location information associated with the wireless location device carried by the object is within the surveillance time window;
determining which of the still images stored on the image server correspond to the location information associated with the surveillance time window; and
retrieving still images from the image server that are associated with the surveillance time window and that depend upon the location information associated with the object in order to track the object.

2. The method of claim 1,
wherein the still images are stored together with respective timestamps that correspond with timestamps of the location information.

3. The method of claim 2,
wherein determining which of the still images correspond to the location information comprises matching the predetermined locations of the coverage areas with the location information associated with the wireless location device and respective time-stamps associated with the still images and location information.

4. The method of claim 1,
wherein determining the location information comprises receiving wireless transmissions from the wireless location device.

5. The method of claim 1,
wherein the one or more base stations have predetermined locations and receive wireless transmissions from the wireless location device.

6. The method of claim 4,
wherein the location information comprises one or more of estimated position of the wireless location device, coverage area identifier, signal strength of wireless transmissions received from the wireless location device, wireless location device identifier, base station identifier, and GPS coordinates of the wireless location device.

7. The method of claim 1, the predetermined event being a change in the location information associated with the object and which corresponds to a predetermined change in location of the object.

8. The method of claim 1,
the predetermined event being the determination that the object is located within one of the coverage areas.

9. The method of claim 1, further comprising:
determining second location information associated with a second location device carried by a second object, the second location information corresponding to one or more of the coverage areas; and
determining which of the still images correspond to the second location information, and retrieving the still images.

10. The method of claim 1,
wherein the determined distance of the wireless location device from one or more base stations is based upon a signal strength of a remote device in relation to each base station.

11. The method of claim 1, further comprising:
obtaining location information at the wireless location device based upon signals received by the wireless location device from the one or more base stations.

12. The method of claim 1,
wherein the recording and storing still images on the image server occurs independently in relation to the surveillance request, the determining which still images stored on the image server correspond to the location information associated with the surveillance time window and the retrieving of still images from the image server that are associated with the surveillance time window, such that at least some recorded and stored still images on the image server are not associated with the surveillance request associated with the object and are thus not retrieved from the image server.

13. The method of claim 1,
wherein the object is lost, and the surveillance request comprises a request to find the lost object.

14. The method of claim 1,
wherein the object comprises one of a person and a computer.

15. A system comprising:
a plurality of still cameras arranged to record still images from respective coverage areas having predetermined locations, wherein the still cameras record the still images at periodic intervals;
an image server coupled to the still cameras and arranged to store the still images recorded by the still cameras, wherein the image server is further arranged to automatically initiate recording of the still images in response to a predetermined event such that no recording of the still images occurs prior to the predetermined event;
a plurality of wireless base stations having respective predetermined locations and operable to communicate wirelessly with a wireless location device carried by an object;
a location server arranged to determine, store and timestamp location information associated with a wireless location device carried by the object, the location information corresponding to one or more of the coverage areas, wherein the location information is determined based at least upon a determined distance of the wireless location device from one or more base stations; and
a tracking server arranged to receive a surveillance request comprising a surveillance time window associated with the object that includes a time period prior to a current time period, to determine which of the still images from the image server correspond to the location information based upon timestamps associated with the location information, and to retrieve the still images from the image server that are associated with the surveillance time window and depend upon the location information associated with the object and with timestamps within the surveillance window in order to track the object.

16. The system of claim 15, wherein the location information comprise one or more of estimated position of the wireless location device, coverage area identifier, signal strength of wireless transmissions received from the wireless location device, wireless location device identifier, base station identifier, and GPS coordinates of the wireless location device.

17. The system of claim 15, wherein the still images stored on the location server are each associated with a respective timestamp, and the timestamps associated with the still images correspond with timestamps associated with the location information.

18. The system of claim 15, wherein the tracking server is further arranged to trigger storing of the still images by the image server in response to the predetermined event.

19. The system of claim 15, wherein:
the location server is further arranged to determine and store second location information associated with a second location device carried by a second object, the second location information corresponding to one or more of the coverage areas; and
the tracking server is further arranged to determine which of the still images correspond to the second location information, and to retrieve the still images.

20. The system of claim 15, wherein the location server is further arranged to determine the distance of the wireless location device from one or more base stations based upon a signal strength of a remote device in relation to each base station.

21. The system of claim 15, wherein the base stations provide signals to the wireless location device, the wireless location device determines location information based upon the signals received from the base stations, and the location server receives location information from the wireless location device.

\* \* \* \* \*